(12) United States Patent
Yamada et al.

(10) Patent No.: US 9,831,671 B2
(45) Date of Patent: Nov. 28, 2017

(54) POWER SUPPLY DEVICE

(71) Applicant: VOLVO TRUCK CORPORATION, Gothenburg (SE)

(72) Inventors: Yoshiaki Yamada, Saitama (JP); Takayuki Tsuchiya, Saitama (JP); Kunihiko Hikiri, Saitama (JP); Koichi Itani, Saitama (JP); Hiroshi Toyama, Saitama (JP); Noriaki Miyake, Saitama (JP)

(73) Assignee: Volvo Truck Corporation, Gothenburg (SE)

( * ) Notice: Subject to any disclaimer, the term of this patent is extended or adjusted under 35 U.S.C. 154(b) by 228 days.

(21) Appl. No.: 14/441,894

(22) PCT Filed: Nov. 9, 2012

(86) PCT No.: PCT/JP2012/079065
§ 371 (c)(1),
(2) Date: May 11, 2015

(87) PCT Pub. No.: WO2014/073087
PCT Pub. Date: May 15, 2014

(65) Prior Publication Data
US 2015/0333513 A1 Nov. 19, 2015

(51) Int. Cl.
*H02J 1/12* (2006.01)
*H02M 3/02* (2006.01)
(Continued)

(52) U.S. Cl.
CPC ............... *H02J 1/12* (2013.01); *B60L 11/005* (2013.01); *B60L 11/1868* (2013.01);
(Continued)

(58) Field of Classification Search
None
See application file for complete search history.

(56) References Cited

U.S. PATENT DOCUMENTS 5,587,894 A 12/1996 Naruo
5,610,807 A 3/1997 Kanda et al.
(Continued)

FOREIGN PATENT DOCUMENTS

CN 1116369 A 2/1996
CN 1132959 A 10/1996
(Continued)

*Primary Examiner* — Rexford Barnie
*Assistant Examiner* — Swarna N Chowdhuri
(74) *Attorney, Agent, or Firm* — Laurence A. Greenberg; Werner H. Stemer; Ralph E. Locher

(57) ABSTRACT

A power supply device for supplying power to a load by combining a secondary battery and a capacitor includes a switching element which switches the supply of power to the load from the capacitor, a DC-DC converter which enables a voltage of the capacitor to be stepped up and supplied to the load and a control unit which enables power to be supplied to the load by pulse-controlling the switching element, controlling the DC-DC converter to output a pulse current alternately with the switching element and combining the alternately output pulse currents if the voltage of the capacitor drops below a minimum voltage capable of driving the load.

5 Claims, 4 Drawing Sheets

(51) Int. Cl.
　　　H02M 3/158　　　(2006.01)
　　　H02J 7/34　　　(2006.01)
　　　B60L 11/00　　　(2006.01)
　　　B60L 15/20　　　(2006.01)
　　　H02M 7/5387　　　(2007.01)
　　　B60L 11/18　　　(2006.01)
　　　B60L 15/00　　　(2006.01)

(52) U.S. Cl.
　　　CPC ......... *B60L 15/007* (2013.01); *B60L 15/2009* (2013.01); *H02J 7/345* (2013.01); *H02M 3/02* (2013.01); *H02M 3/158* (2013.01); *H02M 7/5387* (2013.01); *B60L 2210/14* (2013.01); *Y02T 10/645* (2013.01); *Y02T 10/7005* (2013.01); *Y02T 10/7022* (2013.01); *Y02T 10/7066* (2013.01); *Y02T 10/7225* (2013.01); *Y02T 10/7275* (2013.01); *Y10T 307/516* (2015.04)

(56) References Cited

U.S. PATENT DOCUMENTS

| | | | | |
|---|---|---|---|---|
| 5,631,503 A * | 5/1997 | Cioffi | .................... | H02J 7/0013 307/43 |
| 6,153,949 A * | 11/2000 | Soderhall | .............. | H02J 7/0065 307/125 |
| 7,649,335 B2 | 1/2010 | Ishikawa et al. | | |
| 7,732,947 B2 | 6/2010 | Watanabe et al. | | |
| 8,080,904 B2 * | 12/2011 | Kim | ........................ | H01J 31/50 307/125 |
| 8,278,896 B2 | 10/2012 | Horii | | |
| 8,288,955 B2 | 10/2012 | Rowland | | |
| 8,415,905 B2 | 4/2013 | Sean et al. | | |
| 2009/0260668 A1 | 10/2009 | Maeda | | |
| 2012/0299377 A1 * | 11/2012 | Masuda | ................ | B60L 11/005 307/10.1 |
| 2014/0203634 A1 * | 7/2014 | Sugiyama | ................ | B60L 1/00 307/10.1 |

FOREIGN PATENT DOCUMENTS

| | | |
|---|---|---|
| CN | 101878586 A | 11/2010 |
| CN | 102480148 A | 5/2012 |
| JP | 2001136607 A | 5/2001 |
| JP | 2004135390 A | 4/2004 |
| JP | 2006345606 A | 12/2006 |
| JP | 2008061492 A | 3/2008 |
| JP | 2010515212 A | 5/2010 |

\* cited by examiner

POWER SUPPLY DEVICE

TECHNICAL FIELD

The present invention relates to a power supply device for supplying power to a load.

BACKGROUND ART

Conventionally, a power supply device for supplying power to a load by combining a battery and a capacitor has been used. JP2006-345606A discloses a power supply system for vehicle in which a battery and a capacitor are connected in parallel. In this power supply system, an inverter for an electric motor is driven by electrical energy supplied from the capacitor and the battery.

SUMMARY OF INVENTION

However, in the power supply system of JP2006-345606A, the motor can be no longer driven by the electrical energy from the capacitor if a voltage of the capacitor drops below a voltage capable of driving the inverter. Further, unlike a secondary battery in which a voltage moderately decreases during discharge, the capacitor has a characteristic that a voltage linearly decreases during discharge. Thus, if the voltage of the capacitor drops, the inverter cannot be driven by the supply of the electrical energy from the capacitor despite the remaining electrical energy.

The present invention was developed in view of the above problem and aims to effectively utilize electrical energy of a capacitor.

According to one aspect of the present invention, there is provided a power supply device for supplying power to a load by combining a secondary battery and a capacitor includes a switching element which switches the supply of power to the load from the capacitor, a DC-DC converter which enables a voltage of the capacitor to be stepped up and supplied to the load and a control unit which enables power to be supplied to the load by pulse-controlling the switching element, controlling the DC-DC converter to output a pulse current alternately with the switching element and combining the alternately output pulse currents if the voltage of the capacitor drops below a minimum voltage capable of driving the load.

Embodiments and advantages of this invention will be described in detail below with reference to the attached figures.

DESCRIPTION OF EMBODIMENTS

Hereinafter, a power supply device 100 according to an embodiment of the present invention is described with reference to FIGS. 1 to 4.

Figure 1:
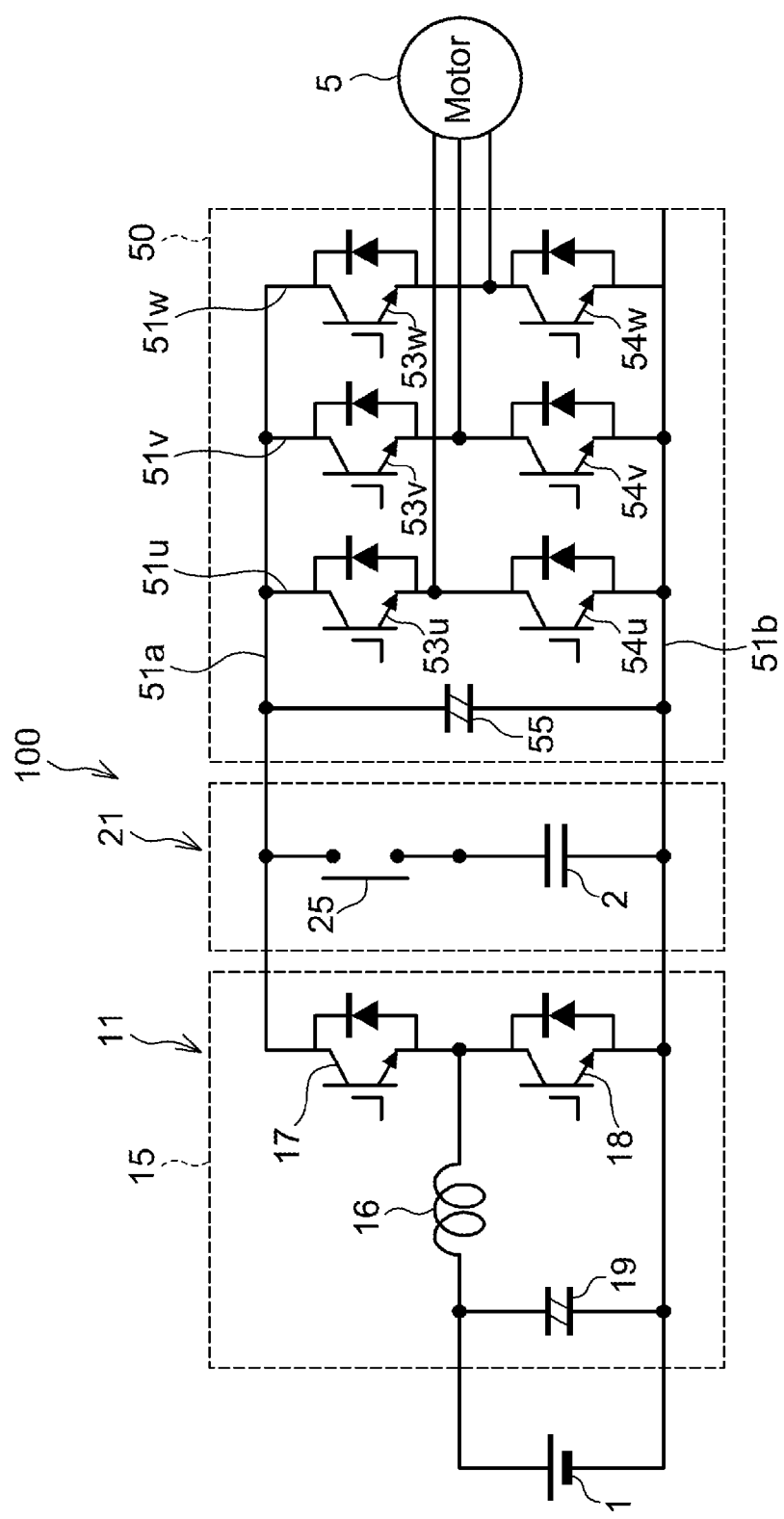
FIG. 1 is an electrical circuit diagram of a power supply device according to an embodiment of the present invention.
Figure 2:
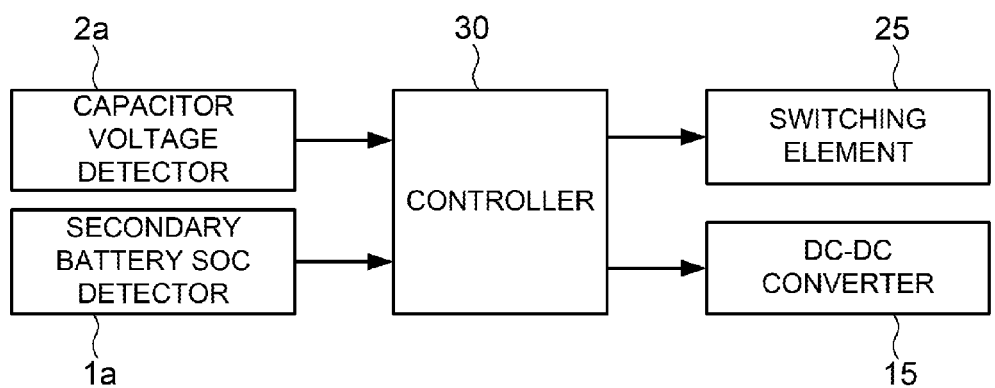
FIG. 2 is a block diagram of the power supply device according to the embodiment of the present invention.

First, the configuration of the power supply device 100 is described with reference to FIGS. 1 and 2.

The power supply device 100 supplies power to a load by combining a secondary battery 1 and a capacitor 2. This load is an inverter 50 for driving an electric motor 5 by the supply of power from the secondary battery 1 and the capacitor 2. The power supply device 100 is applied to an HEV (Hybrid Electric Vehicle), an EV (Electric Vehicle) and the like.

First, the inverter 50 to which power is supplied from the power supply device 100 and the electric motor 5 to be driven by the inverter 50 are described.

The electric motor 5 is a drive motor mounted in an HEV or an EV. The electric motor 5 is a three-phase induction motor generator which is driven by a rotating magnetic field generated by a three-phase alternating current. The electric motor 5 is provided with a stator including a plurality of coils (not shown) constituting each of a U-phase, a V-phase and a W-phase on an inner periphery and a rotator including a permanent magnet and configured to rotate on the inner periphery of the stator. The electric motor 5 is such that the stator is fixed to a vehicle body (not shown) and a rotary shaft of the rotator is coupled to an axle (not shown) of wheels. The electric motor 5 can convert electrical energy into the rotation of wheels and can convert the rotation of the wheels into electrical energy.

The inverter 50 is a current converter for generating alternating current power from direct current power supplied from the secondary battery 1 and the capacitor 2. The inverter 50 has a rated voltage of 600 V and a drivable minimum voltage of 350 V. This minimum voltage corresponds to a minimum voltage capable of driving the load.

The inverter 50 converts the direct current power supplied from the secondary battery 1 and the capacitor 2 into a three-phase alternating current composed of a U-phase, a V-phase and a W-phase shifted at an interval of 120° and supplies it to the electric motor 5.

The inverter 50 includes a positive-side power line 51a, a negative-side power line 51b, a U-phase power line 51u, a V-phase power line 51v and a W-phase power line 51w. The positive-side power line 51a is connected to positive electrodes of the secondary battery 1 and the capacitor 2. The negative-side power line 51b is connected to negative electrodes of the secondary battery 1 and the capacitor 2. The U-phase power line 51u, the V-phase power line 51v and the W-phase power line 51w are provided between the positive-side power line 51a and the negative-side power line 51b. Further, a smoothing condenser 55 for smoothing the direct current power transferred between the secondary battery 1, the capacitor 2 and the inverter 50 is connected in parallel between the positive-side power line 51a and the negative-side power line 51b.

The inverter 50 includes IGBTs (Insulated Gate Bipolar Transistors) 53u, 54u, 53v, 54v, 53w and 54w as six switching elements. These IGBTs 53u to 54w are each an IGBT with a rectifying diode connected in parallel in an opposite direction.

The IGBT 53u and the IGBT 54u are provided in series in the U-phase power line 51u. The U-phase power line 51u, between the IGBT 53u and the IGBT 54u, is connected to the coil constituting the U-phase of the electric motor 5. The IGBT 53v and the IGBT 54v are provided in series in the V-phase power line 51v. The V-phase power line 51v, between the IGBT 53v and the IGBT 54v, is connected to the coil constituting the V-phase of the electric motor 5. The IGBT 53w and the IGBT 54w are provided in series in the W-phase power line 51w. The W-phase power line 51w, between the IGBT 53w and the IGBT 54w, is connected to the coil constituting the W-phase of the electric motor 5.

The inverter 50 generates an alternating current to drive the electric motor 5 by the IGBTs 53$u$, 54$u$, 53$v$, 54$v$, 53$w$ and 54$w$ being controlled by a motor controller (not shown).

Next, the configuration of the power supply device 100 is described.

The power supply device 100 is provided with a secondary battery power supply unit 11 including the secondary battery 1, a capacitor power supply unit 21 including the capacitor 2 and a controller 30 (see FIG. 2) as a control unit for controlling the supply of power to the inverter 50 from the secondary battery 1 and the capacitor 2. The secondary battery power supply unit 11 and the capacitor power supply unit 21 are connected in parallel. That is, the secondary battery 1 and the capacitor 2 are connected in parallel.

The secondary battery 1 is a chemical battery such as a lithium ion secondary battery or a nickel hydrogen secondary battery. Here, a voltage of the secondary battery 1 is set at 300 V. The secondary battery 1 includes a secondary battery SOC detector 1$a$ (see FIG. 2) for detecting a SOC (State of Charge) and transmitting a corresponding signal to the controller 30.

The capacitor 2 is an electric double-layer capacitor in which a plurality of capacitors are connected in series and set at a desired voltage and a plurality of capacitors are connected in parallel and set at a desired storage capacity. Here, a voltage of the capacitor 2 is set at 600 V. The capacitor 2 includes a capacitor voltage detector 2$a$ (see FIG. 2) for detecting a voltage and transmitting a corresponding signal to the controller 30.

The capacitor power supply unit 21 includes a switching element 25 for switching the supply of power to the inverter 50 from the capacitor 2.

The switching element 25 is controlled to be opened and closed by the controller 30. The switching element 25 enables power to be directly supplied to the inverter 50 from the capacitor 2 when being switched to a connected state. The switching element 25 is a switch electrically controllable to be opened and closed at a high speed such as an IGBT or a MOSFET (Metal-Oxide-Semiconductor Field-Effect Transistor).

The switching element 25 is switched to the connected state to continuously supply power to the inverter 50 from the capacitor 2 when the voltage of the capacitor 2 is a voltage capable of driving the electric motor 5. When the switching element 25 is switched to a shut-off state, power cannot be supplied to the inverter 50 from the capacitor 2.

Further, the switching element 25 enables power generated by the electric motor 5 to be directly charged into the capacitor 2 when being switched to the connected state. In this way, an energy loss at the time of charging the capacitor 2 can be reduced.

The secondary battery power supply unit 11 includes a DC-DC converter 15 which enables the voltage of the secondary battery 1 to be stepped up and supplied to the electric motor 5 when the inverter 50 can be no longer driven only by the power from the capacitor 2.

The DC-DC converter 15 enables the voltage of the secondary battery 1 to be stepped up and supplied to the electric motor 5 and enables the power generated by the electric motor 5 to be stepped down and charged into the secondary battery 1.

The DC-DC converter 15 includes a reactor 16 provided downstream of the secondary battery 1, a step-down control transistor 17 provided between the reactor 16 and an upstream side of the electric motor 5 and capable of stepping down a charge voltage from the electric motor 5 by switching, and a step-up control transistor 18 provided between the reactor 16 and a downstream side of the electric motor 5 and capable of stepping up a supply voltage to be supplied to the electric motor 5 by an induced electromotive force by switching a current of the reactor 16.

The reactor 16 accumulates energy when the step-up control transistor 18 is on. When the step-up control transistor 18 is turned off, an induced electromotive force by the voltage input from the capacitor 2 and the energy accumulated in the reactor 16 is output. In this way, the reactor 16 can step up and output the input voltage by the switching of the step-up control transistor 18.

The step-up control transistor 18 is switched by the controller 30. The step-up control transistor 18 is an IGBT with a rectifying diode connected in parallel in an opposite direction. The step-up control transistor 18 can step up the supply voltage to be supplied to the electric motor 5 by the induced electromotive force by switching the current of the reactor 16.

When the step-up control transistor 18 is switched on, a current from the positive electrode of the capacitor 2 flows to the negative electrode of the capacitor 2 by way of the reactor 16 and the step-up control transistor 18. By this current loop, energy is accumulated in the reactor 16.

The step-down control transistor 17 is switched by the controller 30. The step-down control transistor 17 is an IGBT with a rectifying diode connected in parallel in an opposite direction. The step-down control transistor 17 can step down a charge voltage from the electric motor 5 by switching. The step-down control transistor 17 steps down the power generated by the electric motor 5 by a chopper control and charges it into the capacitor 2.

A smoothing condenser 19 smoothes the voltage output by the chopper control of the step-down control transistor 17. In this way, the power generated by the electric motor 5 can be stabilized by smoothing the voltage at the time of charging the capacitor 2.

The controller 30 (see FIG. 2) controls the power supply device 100. The controller 30 is a microcomputer with a CPU (Central Processing Unit), a ROM (Read-Only Memory), a RAM (Random Access Memory) and an I/O interface (Input/Output interface). The RAM stores data in the process of the CPU. The ROM stores a control program of the CPU and the like in advance. The I/O interface is used to input and output information from and to a connected device. By operating the CPU, the RAM and the like in accordance with the program stored in the ROM, the control of the power supply device 100 is realized.

Figure 3:
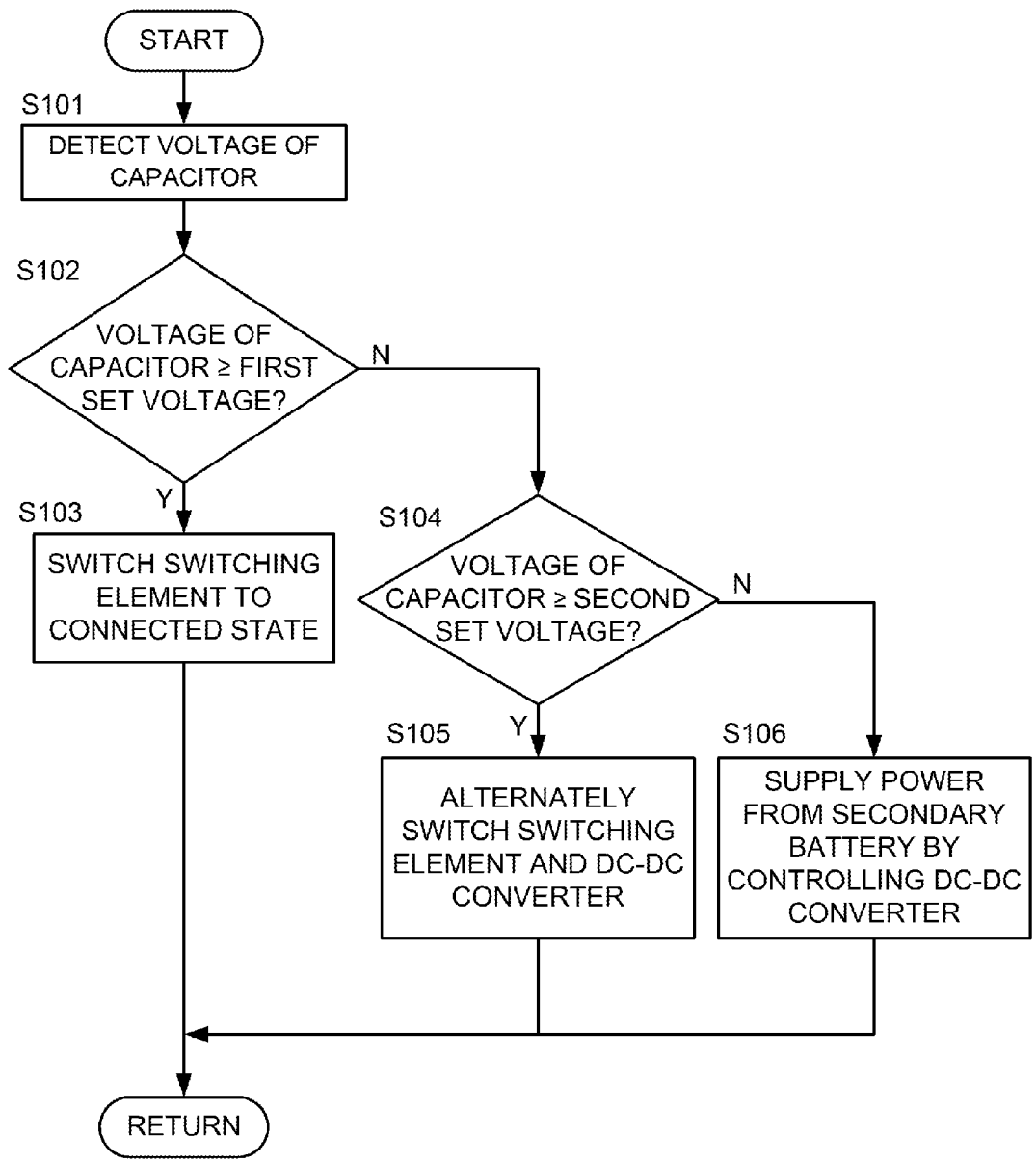
FIG. 3 is a flow chart showing a power supply control from the power supply device to a load.
Figure 4:
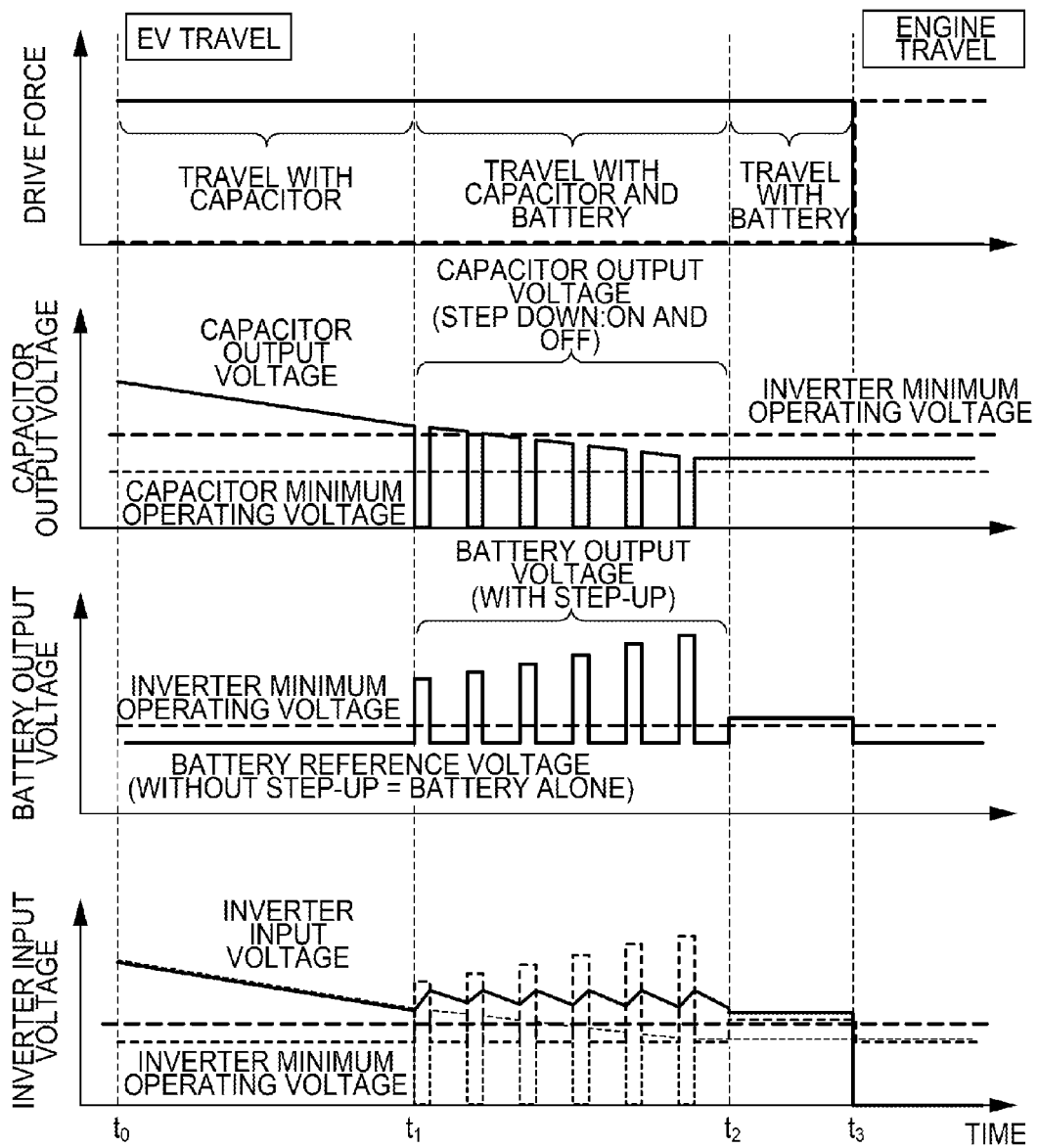
FIG. 4 is a chart showing functions of the power supply device.

Next, the control of the power supply device 100 by the controller 30 is described with reference to FIGS. 3 and 4. The controller 30 repeatedly executes a routine shown in FIG. 3 at a fixed time interval of, e.g. 10 milliseconds. In FIG. 4, horizontal axes represent time and vertical axes successively represent a drive force of the electric motor 5, an output voltage of the capacitor 2, an output voltage of the secondary battery 1 and an input voltage of the inverter 50 from above.

In Step S101, the controller 30 reads a voltage of the capacitor 2 detected by the capacitor voltage detector 2$a$.

In Step S102, the controller 30 determines whether or not the voltage of the capacitor 2 is greater than or equal to a first set voltage. If the voltage of the capacitor 2 is determined to be greater than or equal to the first set voltage in Step S102, a return is made after a transition is made to Step S103.

This first set voltage is set at a value higher than the minimum voltage capable of driving the inverter 50 by a margin voltage. Since the minimum voltage capable of driving the inverter 50 is 350 V here, the first set voltage is set at a value slightly higher than 350 V.

In Step S103, the controller 30 sets the switching element 25 to the connected state. In this way, power is continuously supplied from the capacitor 2 to the inverter 50 and the electric motor 5 is driven.

This state corresponds to a period between $t_0$ and $t_1$ in FIG. 4. Specifically, EV travel by the electric motor 5 is started from to and the voltage of the capacitor 2 proportionally decreases by as much as the consumed electrical energy. This EV travel is continued until the voltage of the capacitor 2 approaches the minimum voltage capable of driving the inverter 50 and drops below the aforementioned first set voltage.

Since the power is directly supplied from the capacitor 2 to the inverter 50 at this time, an energy loss is small. Thus, a large current can be instantaneously supplied to the inverter 50, taking advantage of a characteristic of the capacitor 2.

On the other hand, a transition is made to Step S104, from Step S102, if the voltage of the capacitor is determined to be lower than the first set voltage. At this time, the electrical energy remains in the capacitor 2. If a decrease of the electrical energy is considered to be proportional to a voltage drop, about 34% of the electrical energy remains in the capacitor 2, whose voltage was dropped from 600 V to 350 V, if the electrical energy at full charge is assumed as 100%.

Conventionally, if the voltage of the capacitor 2 drops below the minimum voltage capable of driving the inverter 50, the inverter 50 is no longer driven by the capacitor 2 although the electrical energy remains in the capacitor 2. Accordingly, in the power supply device 100, the electrical energy remaining in the capacitor 2 is utilized in the following manner.

In Step S104, the controller 30 determines whether or not the voltage of the capacitor 2 is greater than or equal to a second set voltage. If the voltage of the capacitor 2 is determined to be greater than or equal to the second set voltage in Step S104, a return is made after a transition is made to Step S105. On the other hand, a return is made after a transition is made to Step S106 if the voltage of the capacitor is determined to be lower than the second set voltage.

This second set voltage is set at a value higher than a minimum operating voltage, which is a minimum voltage at which the capacitor 2 is operable, by a margin voltage. Further, the second set voltage is set at a value lower than the aforementioned first set voltage.

In Step S105, the controller 30 enables power to be supplied to the inverter 50 by pulse-controlling the switching element 25, controlling the DC-DC converter 15 to output a pulse current alternately with the switching element 25 and combining the alternately output pulse currents.

This state corresponds to a period between $t_1$ and $t_2$ in FIG. 4. Specifically, if the voltage of the capacitor 2 becomes lower than the first set voltage at $t_1$, the controller 30 first sets the switching element 25 to the shut-off state to stop the supply of power to the inverter 50 from the capacitor 2. Simultaneously, the controller 30 controls the DC-DC converter 15 to step up the power from the secondary battery 1 to a voltage higher than the first set voltage and supply power to the inverter 50 from the secondary battery 1. Subsequently, the controller 30 controls the DC-DC converter 15 to stop the supply of power to the inverter 50 from the secondary battery 1. Simultaneously, the controller 30 sets the switching element 25 to the connected state and causes power to be supplied to the inverter 50 from the capacitor 2.

The controller 30 combines a pulse current from the capacitor 2 and a pulse current from the secondary battery 1 by repeatedly performing these operations at a high speed. In this way, power having a voltage higher than the minimum voltage capable of driving the inverter 50 is supplied to the inverter 50. Thus, the EV travel started from to is continued up to $t_2$ beyond $t_1$. This EV travel is continued until the voltage of the capacitor 2 approaches the minimum operating voltage and drops below the aforementioned second set voltage.

At this time, a fluctuation of the voltage of the power input to the inverter 50 is smoothed by the smoothing condenser 55. Further, the DC-DC converter 15 increases a gain for stepping up the voltage of the secondary battery 1 according to a voltage drop of the capacitor 2. In this way, a voltage drop of the capacitor 2 can be compensated for.

As described above, the controller 30 enables power to be supplied to the inverter 50 by pulse-controlling the switching element 25, controlling the DC-DC converter 15 to output a pulse current alternately with the switching element 25 and combining the alternately output pulse currents if the voltage of the capacitor 2 drops below the minimum voltage capable of driving the inverter 50.

In this way, even if the voltage of the capacitor 2 drops below the minimum voltage capable of driving the inverter 50, power is supplied to the inverter 50 by controlling the switching element 25 and the DC-DC converter 15 to combine the pulse currents alternately output from the capacitor 2 and the secondary battery 1. Thus, the inverter 50 can be driven using the electrical energy remaining in the capacitor 2 and the electrical energy of the capacitor 2 can be effectively utilized.

Further, since the electrical energy of the capacitor 2 can be effectively utilized, the capacity of the capacitor 2 necessary to output the same electrical energy to the inverter 50 can be reduced. Thus, the capacitor 2 can be reduced in size and weight. Further, since an EV travelable distance becomes longer than before when the power supply device 100 is applied to an HEV, the amount of fuel consumption by an engine can be reduced.

On the other hand, in Step S106, the controller 30 enables power to be continuously supplied to the inverter 50 from the secondary battery 1 by switching the switching element 25 to the shut-off state and controlling the DC-DC converter 15. Since the electrical energy in the capacitor 2 is already reduced to an unusable level in Step S106, the inverter 50 is driven using the secondary battery 1. Specifically, the inverter 50 is driven by stepping up the voltage of the secondary battery 1 from 300 V to the aforementioned first set voltage.

That is, if the voltage of the capacitor 2 becomes lower than the second set voltage, the supply of power to the inverter 50 from the capacitor 2 is stopped and power is supplied to the inverter 50 only from the secondary battery 1 via the DC-DC converter 15.

This state corresponds to a period between $t_2$ and $t_3$ in FIG. 4. Specifically, the EV travel started from to is continued up to $t_3$ beyond $t_2$ since the voltage of the secondary battery 1 is stepped up by the DC-DC converter 15 and supplied to the inverter 50.

This EV travel can be continued until the SOC of the secondary battery 1 detected by the secondary battery SOC detector 1a drops below a set value. It should be noted that, in the case of an HEV, even if the SOC of the secondary battery 1 detected by the secondary battery SOC detector 1*a* drops below the set value, an engine (not shown) of the vehicle operates and the vehicle can travel using a drive force from the engine.

According to the above embodiment, the following effects are exhibited.

In the power supply device 100, the controller 30 enables power to be supplied to the inverter 50 by controlling the switching element 25 and the DC-DC converter 15 to combine the pulse currents alternately output from the capacitor 2 and the secondary battery 1 if the voltage of the capacitor 2 drops below the minimum voltage capable of driving the inverter 50. At this time, the DC-DC converter 15 enables the voltage of the secondary battery 1 to be stepped up.

Thus, the voltage of the power supplied to the inverter 50 can be stepped up to the voltage capable of driving the inverter 50 by combining the stepped-up pulse current from the secondary battery 1 with the pulse current from the capacitor 2. Thus, the inverter 50 can be driven using the electrical energy remaining in the capacitor 2 and the electrical energy of the capacitor 2 can be effectively utilized.

Further, since the electrical energy of the capacitor 2 can be effectively utilized, the capacity of the capacitor 2 necessary to output the same electrical energy to the inverter 50 can be reduced. Thus, the capacitor 2 can be reduced in size and weight. Further, since an EV travelable distance becomes longer than before when the power supply device 100 is applied to an HEV, the amount of fuel consumption by an engine can be reduced.

Embodiments of the this invention were described above, but above embodiments are merely examples of the applications of this invention, and the technical scope of the this invention is not limited to the specific constitutions of the above embodiments.

For example, numerical values such as those of the voltages in the aforementioned embodiment are illustrative and there is no limitation to these numerical values.

Further, in the aforementioned embodiment, the power supply device 100 is controlled by the controller 30 and the inverter 50 is controlled by the motor controller (not shown). Instead of this, the power supply device 100 and the inverter 50 may be controlled by a single controller.

Further, each of the aforementioned IGBTs is an IGBT with a rectifying diode connected in parallel in an opposite direction. Instead of this, an IGBT incorporating no diode and a rectifying diode connected in parallel to the IGBT in an opposite direction may be separately provided.

The embodiments of this invention in which an exclusive property or privilege is claimed are defined as follows:

1. A power supply device for supplying power to a load by combining a secondary battery and a capacitor, comprising:
    a switching element adapted to switch the supply of power to the load from the capacitor;
    a DC-DC converter adapted to enable a voltage of the secondary battery to be stepped up and supplied to the load; and
    a control unit adapted to enable power to be supplied to the load by pulse-controlling the switching element, controlling the DC-DC converter to output a pulse current alternately with the switching element and combining the alternately output pulse currents if the voltage of the capacitor drops below a minimum voltage capable of driving the load.

2. The power supply device according to claim 1, wherein:
    the DC-DC converter increases a gain for stepping up a voltage of the secondary battery according to a voltage drop of the capacitor.

3. The power supply device according to claim 1, wherein:
    the switching element enables power to be continuously supplied to the load from the capacitor if the voltage of the capacitor is a voltage capable of driving the load.

4. The power supply device according to claim 1, wherein:
    the control unit enables power to be supplied to the load by pulse-controlling the switching element, controlling the DC-DC converter to output a pulse current alternately with the switching element and combining the alternately output pulse currents if the voltage of the capacitor becomes lower than a voltage higher than the minimum voltage capable of driving the load by a margin voltage.

5. The power supply device according to claim 1, wherein:
    the control unit enables power to be continuously supplied to the load from the secondary battery by switching the switching element to a shut-off state and controlling the DC-DC converter if the voltage of the capacitor becomes lower than a voltage higher than a minimum operating voltage of the capacitor by a margin voltage.

\* \* \* \* \*